Sept. 4, 1951      J. J. LA DUCA      2,566,841
CLOTHES CLAMP
Filed June 3, 1948
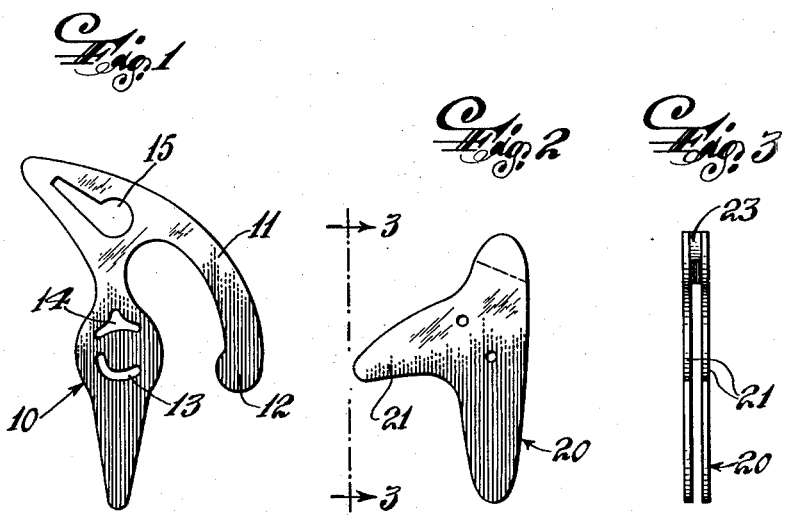
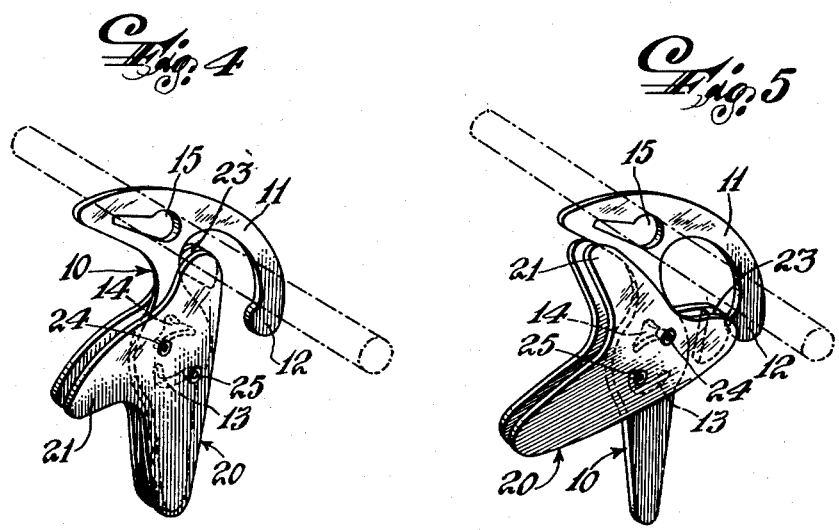
INVENTOR.
Joseph J. LaDuca
BY
Angelo M. Pisarra
ATTORNEY Patented Sept. 4, 1951

2,566,841

UNITED STATES PATENT OFFICE 2,566,841

CLOTHES CLAMP

Joseph J. La Duca, Newark, N. J.

Application June 3, 1948, Serial No. 30,925

3 Claims. (Cl. 24—137)

This invention relates to novel articles of manufacture and more particularly to clips, clasps or clothespins employed for hanging or suspending material, such as sheets, clothes and the like for drying. In one of its more specific aspects the invention is directed to that class of devices in said general class which has a pivoted dog between a pair of inverted arms.

The primary object of this invention is to provide a device of the aforementioned class, which is of attractive design, is rugged, may be readily manufactured even by unskilled operators, and most of whose parts may be cast or injected molded and composed of a plastic material, such as the well known plastics, such as the styrene, methacrylate, phenol-aldehyde resins or the like, and if desired of metal such as aluminum, which may be readily and easily stamped.

This as well as other objects and advantages of the invention will be apparent from the following description taken in conjunction with the appended drawings, wherein:

Fig. 1 is a side view of the intermediate supporting and locking element of my novel device.

Fig. 2 is a side view of the outside locking element of the novel device.

Fig. 3 is a view looking at the element as shown in Fig. 2 in the direction of arrows on line 3—3 of Fig. 2.

Fig. 4 is a view in perspective showing the elements of Figs. 1, 2 and 3 in assembled condition and on a clothesline, but with the parts in inoperative relationship.

Fig. 5 is a view similar to Fig. 4, but with the elements of Figs. 1, 2 and 3 in inoperative relationship.

As shown in the drawings there is provided a supporting body 10 having a curved tail or hook-like member 11 terminating in a free end 12. The center of the body has a slot or opening 13 therein, somewhat in the shape of an L lying on its longer arm. Also in the center of said body is another slot or opening 14 of generally triangular configuration. The upper end of the body 10 has an opening 15 therein which is generally in the form of a bayonet slot.

A pair of outside elements 20 of similar contour are in combination with the intermediate element 10 which is located therebetween. Each of the elements 20 has an outwardly projecting portion 21. Located in the space between one end of elements 20 is a section of a rubbery or other resilient material 23 which may be adhesively secured thereto, and which may be flush with or extend slightly beyond the side edges thereof.

A pair of spacer rivets 24 and 25 are secured to the elements 20, to secure them together in spaced relation to each other. The shanks of rivets 24 and 25 pass through the respective slots or openings 14 and 13 of the element 10.

As shown in Fig. 4, the novel combination, constructed and assembled as before set forth, may have a clothesline inserted through the enlarged portion of the bayonet slot 15. When so located, the entire clip assembly may be freely slid along the clothesline to the desired position thereon. As shown in Fig. 4, the major portion of the assembly extends downwardly from the clothesline, with the lower part of element 10 being almost substantially completely within the space between elements 20. With this positioning of parts, the shank of spacer rivet 25 is located at the closed end of the longer arm of opening 13 and the shank of spacer rivet 24 is located at an extreme closed end of the opening 14. Thus the elements are latched to each other in inoperative position. When sheets are to be hung, a portion is placed between end 12 and rubbery section 23, then the projections 21 are grasped and elements 20 swung so that the shank of rivet 25 is located at the closed end of short arm of opening 13 and shank of rivet 24 is located in the other extreme closed end of opening 14 whereby the elements are latched in the relationship shown in Fig. 5 to support the sheet. If the article to be hung is thick, then the elements are so disposed that the shanks of the rivets 24 and 25 are located respectively in the center closed end of slot 14 and in the closed end of short arm of slot 13.

Due to the force exerted on the element 10 by the weight of the material clamped thereby the clothesline bites into the elongated portion of the bayonet slot 15 so that the device is anchored thereto at that place.

I claim:

1. A clothes clamp comprising a central member, said central member comprising an elongated member and a hook-like member integrally joined to one end of said elongated member, said elongated member having a pair of openings therein, one of said openings being of generally triangular shape and the other of generally L shape, said elongated member having an opening through the end where the said elongated member and the said hook-like member are joined and remote from the free end of said hook-like member to accommodate a clothes line, a pair of similar elements, said central member located between said similar elements, and means secured to said similar elements and extending through said triangular and L shaped openings and cooperating therewith when disposed at predetermined closed ends of said openings to maintain the hook-like member of said central member in inoperative position away from said similar elements, said similar elements and said means being movable in unison with respect to said central member to dispose said means at predetermined other closed ends of said openings to maintain said hook-like member in operative position adjacent said similar elements to clamp an element between said hook-like member and said similar members.

2. A clothes clamp comprising a central member, said central member comprising an elongated member and a hook-like member integrally joined to one end of said elongated member, said elongated member having a pair of openings therein, one of said openings being of generally triangular shape and the other of generally L shape, said elongated member having an opening through the end where the said elongated member and the said hook-like member are joined and remote from the free end of said hook-like member to accommodate a clothes line, a pair of similar elements, said central member located between said similar elements, means secured to said similar elements and extending through said triangular and L shaped openings and cooperating therewith for maintaining said similar elements and said central member in various predetermined relationships with respect to each other, and resilient means located between the inner faces of said similar elements, secured thereto and located adjacent the free end of said hook-like member when in operative position, said first means and similar elements being movable in unison to dispose said first means at predetermined closed ends of said openings to latch said elements and said central member and maintain said hook-like member in inoperative position away from said resilient means, said first means and similar elements being movable to unlatch said similar elements and said central member from the aforesaid relationship and to dispose said first means in other ends of said openings to latch said similar elements and said member and maintain said hook-like member in operative position adjacent said resilient means.

3. A clothes clamp comprising a central member, said central member comprising an elongated member and a hook-like member integrally joined to one end of said elongated member, said elongated member having a pair of openings therein, one of said openings being of generally triangular shape and the other of generally L shape, said elongated member having an opening through the end where the said elongated member and the said hook-like member are joined and remote from the free end of said hook-like member to accommodate a clothes line, a pair of similar elements, said central member located between said similar elements, and means secured to said similar elements to maintain them in spaced relationship to each other and including a pair of shanks, one of said shanks extending through said triangular opening and the other shank extending through said L shaped opening, said similar elements and said means movable in unison with respect to said central element to dispose said first mentioned shank at one extreme closed end of said triangular opening and at the same time to dispose said second mentioned shank at the closed end of the longer arm of said L shaped opening to latch said similar elements and said central member in inoperative relation, said similar elements and said shanks being movable in unison with respect to said central element to dispose said first mentioned shank at one of the other closed ends of said triangular opening and at the same time to dispose said second mentioned shank at the closed end of the short arm of said L shaped opening to latch said similar elements and said central element in operative relationship for clamping an element between the free end of said hook-like member and said similar elements.

JOSEPH J. LA DUCA.

REFERENCES CITED

The following references are of record in the file of this patent:

UNITED STATES PATENTS

| Number | Name | Date |
| --- | --- | --- |
| 1,409,014 | Long et al. | Mar. 7, 1922 |
| 1,446,214 | Schlopia | Feb. 20, 1923 |